United States Patent
Seow (10) Patent No.: US 10,919,737 B2
(45) Date of Patent: Feb. 16, 2021

(54) ROTATABLE ANCHORING ASSEMBLY

(71) Applicant: Tiong Bin Seow, Singapore (SG)

(72) Inventor: Tiong Bin Seow, Singapore (SG)

( * ) Notice: Subject to any disclaimer, the term of this patent is extended or adjusted under 35 U.S.C. 154(b) by 138 days.

(21) Appl. No.: 16/316,267

(22) PCT Filed: Jul. 7, 2017

(86) PCT No.: PCT/SG2017/050346
§ 371 (c)(1),
(2) Date: Jan. 8, 2019

(87) PCT Pub. No.: WO2018/017016
PCT Pub. Date: Jan. 25, 2018

(65) Prior Publication Data
US 2019/0308850 A1    Oct. 10, 2019

(30) Foreign Application Priority Data
Jul. 19, 2016  (SG) ............................. 10201605907Y (51) Int. Cl.
| *F16B 45/00* | (2006.01) |
| *B66C 1/66* | (2006.01) |
| *A62B 35/00* | (2006.01) |
| *F16B 39/02* | (2006.01) |
| *F16G 15/02* | (2006.01) |
| *F16G 15/08* | (2006.01) |
| *F16B 35/06* | (2006.01) |

(52) U.S. Cl.
CPC ............ *B66C 1/66* (2013.01); *A62B 35/0068* (2013.01); *F16B 39/02* (2013.01); *F16G 15/02* (2013.01); *F16G 15/08* (2013.01); *F16B 35/06* (2013.01); *F16B 45/00* (2013.01)

(58) Field of Classification Search
CPC ............. F16B 35/06; F16B 45/00; B66C 1/66
USPC ................................ 411/400, 401, 396, 397
See application file for complete search history.

(56) References Cited

U.S. PATENT DOCUMENTS

| 3,492,033 A | * | 1/1970 | Mueller | .................. F16G 15/08 403/78 |
| 4,266,460 A | * | 5/1981 | Klimowicz | ............. F16B 39/04 411/315 |
| 5,054,982 A | * | 10/1991 | Freeman | ................... B66C 1/66 24/598.9 |
| 5,286,130 A | * | 2/1994 | Mueller | .................... B66C 1/66 294/215 |

(Continued)

*Primary Examiner* — Flemming Saether
(74) *Attorney, Agent, or Firm* — Sinorica, LLC (57) ABSTRACT

An anchoring assembly comprises a stud with an external elongate surface carrying a screw thread, and a through tunnel fabricated on the stud intersecting and perpendicular to a longitudinal axis of the stud; a construct comprising an eyelet enclosing an opening and a pair of holder members extending out from the eyelet; a nut having a sidewall defining an internally threaded passage, the nut carrying a pair of axially aligned and radially extending through holes on the sidewall, the through holes being adjustable to align with the through tunnel forming a continuous passage thereof; and a pivot pin fillable into the passage across the through holes and the through tunnel to lock the nut to the stud. The eyelet is configured to be rotatable around the longitudinal axis of the stud and the locked nut impedes the construct to move along longitudinal axis of the stud.

13 Claims, 7 Drawing Sheets

(56) References Cited

U.S. PATENT DOCUMENTS

| | | | | |
|---|---|---|---|---|
| 6,068,310 | A * | 5/2000 | Fuller | B66C 1/66 294/215 |
| 6,199,925 | B1 * | 3/2001 | Alba | B66C 1/66 294/215 |
| 6,578,889 | B2 * | 6/2003 | Pearl | B66C 1/66 248/499 |
| 2019/0031473 | A1 * | 1/2019 | Kim | F16G 15/02 |

* cited by examiner

ROTATABLE ANCHORING ASSEMBLY

FIELD OF TECHNOLOGY

The present disclosure relates to an anchoring assembly can be installed and used for height access, load hoisting, and/or fall protection. More particularly, the disclosed anchoring assembly includes an eyelet rotatable around a longitudinal axis of a stud secured to a base member. The eyelet revolves around the longitudinal axis, according to the force applied and exerted by the load secured through the disclosed assembly, for correcting the alignment such that at least partially transfer the load to the base member.

BACKGROUND

Hoist ring or eye-bolt assemblies are widely used in various industries to provide anchorage point on heavy objects. These assemblies or rings are preferably used together with other load lifting tools such as cranes, jacks and hoists to move the anchored object from one location to another. In addition to that, hoist ring is adapted for height access activities including emergency descent or ascend for rescue mission and thus implementable as well for fall arrest or protection. In view of the task involved, hoist rings are considered critical safety items that failure of which may result not only monetary loss but put life at risk also. Still, the produced hoist rings need to be simple and easy for installation as well as inexpensive for wider adoption. Therefore, numerous efforts have been put into developing different hoist ring carrying improved features. For instance, U.S. Pat. No. 3,297,293 disclosing a load coupling device that a pair of pivot pins are used to fix a coupling member on a bushing to effectuate pivot movement of the coupling member when the coupling member is attached with a load. Hoist ring of similar design is disclosed in another U.S. Pat. No. 5,405,210 with the pivot pin being integrally incorporated into the U-shaped coupling member. These hoist rings require relatively large number of separate small parts to be assembled for rendering the unit operable. Installation of these hoist ring can be time-consuming and far from user friendly. Also, these hoist rings are greatly dependent on the lock pins, integral or not, and the integrity of the bushing to withstand the load applied that the loading capability. Fuller et al. attempted to further improve on hoist ring in their disclosure set forth in U.S. Pat. No. 6,652,012. The apparatus of Fuller et al. allows the load bearing ring to automatically adjust towards the direction of the applied force by way of two axes movement, claiming that the like feature enhances overall structural integrity of the produced hoist ring. Still, the invention of Fuller et al. may share similar downside of the earlier discussed products that the load bearing property is dependent on the pivot pin in general. European patent application no. 1961690 describes another simplified hoist ring with an eyelet rotatable around a screw fixed to a load member that the hoist ring essentially comprises a fastening element carrying an eyelet and a base attached to the eyelet, and a screw having a head retainable within the based to effectuate rotation of the eyelet thereto. However, the rotatable eyelet of this European application is not releasable from the screw and has to be fixed to the screw upon installation of the hoist ring rendering the described product inflexible for use. Further European patent application no. 2182228 set out to mend the aforementioned deficiency found in EP1961690 by introducing a bushing, which is separable from the base of the fastening element to release the screw head, to aid in detention of the screw head within the base of the fastening element. Despite their simplified designs, the strength of these constructed hoist rings again is only as strong as the engagement established between the base of the fastening element and the screw head rather than capitalizing on the sturdiness of other parts, such as screw shank, found in the eye-bolt or hoist ring. Therefore, the need of eye-bolt with simple design yet mechanical strong is still existed.

SUMMARY

The present disclosure aims to provide an anchoring assembly, which is applicable as eyebolt, hoist ring, height access and/or fall-arrest anchor. The anchoring assembly can be used for lifting and/or moving of a load member from one location to another. The disclosed assembly is adapted to serve as an anchor point for height access or fall-protection according to the manner and place of which being installed.

Another object of the present disclosure aims to offer an anchoring assembly with simple design that the disclosed assembly can be easily installed without the skill of any trained workers. Preferably, the fastening construct of the disclosed assembly can be mounted to the stud portion in a separate occasion after the stud is fixed or secured to a loaded base member. By allowing the partial installation, the disclosed assembly facilitates its implementation as anchor point for fall-arrest and/or fall-protection.

Further object of the present disclosure is directed to an anchoring assembly being configured to feature an eyelet rotatable around center axis of the disclosed assembly that the eyelet can self-align towards an exerted force. More importantly, the eyelet rotates and aligns in a fashion to subject the stud of the disclosed assembly for supporting, sustaining, or coping with the load applied thereto.

One aspect of the present disclosure refers to an anchoring assembly. The assembly comprises a stud with an external elongate surface carrying a screw thread, and a through tunnel fabricated on the stud intersecting and perpendicular to the longitudinal axis of the stud; a construct comprising an eyelet enclosing an opening and a pair of holder members extending out from the eyelet, each of the holder members defining an aperture at its center axis and the defined aperture being of a diameter 0.1 to 2 mm greater than the diameter of the stud, the holder members being axially aligned with a cavity of a predetermined length spacing each other for receiving the stud through the apertures; a nut having a sidewall defining an internally threaded passage, the nut being securable onto the stud through the screw thread and resided within the cavity to interpose between the paired holder members, the nut carrying a pair of axially aligned and radially extending through holes on the sidewall, the through holes being adjustable to align with the through tunnel forming a continuous passage thereof; and a pivot pin fillable into the passage across the through holes and the through tunnel to lock the nut to the stud. Preferably, the eyelet is rotatable around the longitudinal axis of the stud and the locked nut impedes the construct to move along longitudinal axis of the stud. The opening of the eyelet may be arranged on a plane perpendicular to a plane at which the aperture of the holder members are oriented.

In several embodiments, the opening of the eyelet is arranged on a plane corresponding to the longitudinal axis of the stud and the eyelet is free from intersecting with the longitudinal axis of the stud. Preferably, the eyelet is located or attached to the sidewall of the holder members.

For several embodiments, the eyelet has a center axis and the center axis is configured to offset or unaligned with the longitudinal axis of the stud such that the eyelet automatically aligns towards a force upon pulling of the force. Preferably, the eyelet is fashioned to automatically revolve around the longitudinal axis of the stud constantly forming an angle between the longitudinal axis of the stud and the direction of the force such that the direction of the force and the longitudinal axis of the stud are non-parallel.

According to a number of embodiments, the opening of the eyelet is arranged on a plane corresponding to the longitudinal axis of the stud and the center axis of the eyelet is substantially intersecting with the longitudinal axis of the stud. In more specific, the opening of the eyelet is located above of the holder members. In a few embodiments, the at least part of one holder member may participate in defining the opening of the eyelet.

In some embodiments, the holder member closer to the eyelet has a thickness relatively lower than the holder member located further away from the eyelet.

For a plurality of embodiments, the nut has a thickness of 0.05 to 1 mm shorter than the predetermined length of the cavity spacing the holder members apart. The clearance provided permits rotational movement of the construct around the longitudinal axis of the stud while the holder members hinge to the stud.

According to a number of embodiments, the construct is an integral piece to adopt a more simplified design and favor easier installation or set up of the disclosed assembly.

In some embodiments, the stud has two ends that the construct is mounted approximate to one end and another end of the stud is secured to a loaded base member. Preferably, the construct is spaced away from the base member at a predetermined distance of 3 to 8 cm along the longitudinal axis of the stud.

BRIEF DESCRIPTION OF DRAWINGS

FIG. 3 illustrates (a) front view and (b) top view of the construct used for embodiment presented in FIG. 1;

FIG. 6 illustrates (a) front view and (b) top view of the construct used for embodiment presented in FIG. 4;

DETAILED DESCRIPTION

Hereinafter, the invention shall be described according to the preferred embodiments of the present invention and by referring to the accompanying description and drawings. However, it is to be understood that limiting the description to the preferred embodiments of the invention and to the drawings is merely to facilitate discussion of the present invention and it is envisioned that those skilled in the art may devise various modifications without departing from the scope of the appended claim.

Figure 1:
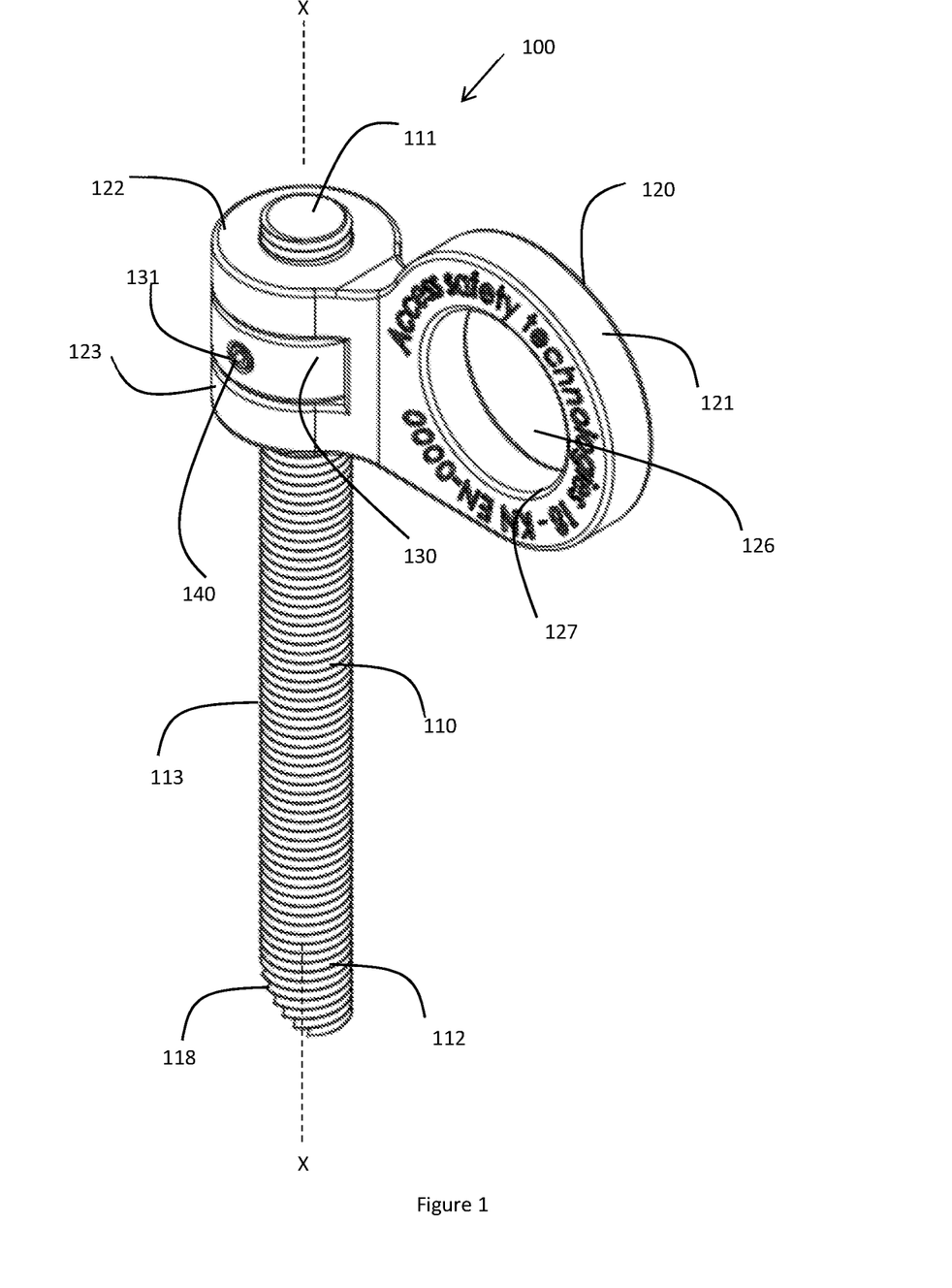
FIG. 1 shows perspective view of one embodiment of the disclosed assembly.
Figure 4:
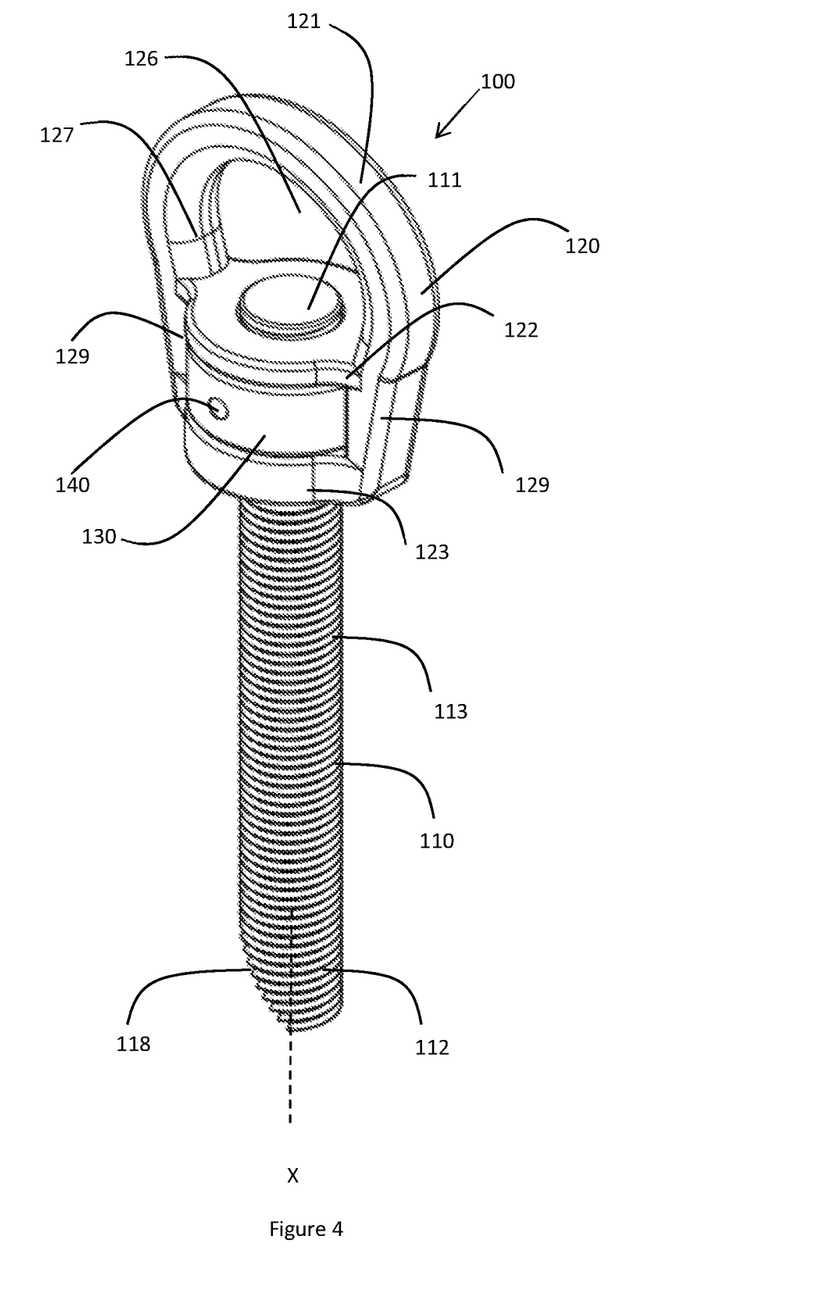
FIG. 4 present perspective view of another embodiment of the disclosed anchoring assembly which has the eyelet aligned with the longitudinal axis of the stud.

One aspect of the present disclosure relates to an anchoring assembly 100 as described hereinafter. For a number of embodiments, the disclosed anchoring assembly 100, as illustrated in FIGS. 1 and 4, comprises a stud 110 with an external elongate surface carrying a screw thread 113, and a through tunnel (not shown) fabricated on the stud 110 intersecting and perpendicular to the longitudinal axis of the stud 110; a construct 120 comprising an eyelet 121 enclosing an opening 126 and a pair of holder members 122, 123 extending out from the eyelet 121, each of the holder members 122, 123 defining an aperture 125 at its center axis and the defined aperture 125 being of a diameter 0.1 to 2 mm greater than the diameter of the stud 110, the holder members 122, 123 being axially aligned with a cavity 124 of a predetermined length and width spacing each other for receiving the stud 110 through the apertures 125; a nut 130 having a sidewall defining an internally threaded passage, the nut 130 being securable onto the stud 110 through the screw thread 113 and resided within the cavity 124 to interpose between the paired holder members 122, 123, the nut 130 carrying a pair of axially aligned and radially extending through holes 131 on the sidewall, the through holes 131 being adjustable to align with the through tunnel forming a continuous passage thereof; and a pivot pin 140 fillable into the passage across the through holes 131 and the through tunnel to lock the nut 130 to the stud 110. By the aid of the pivot pin 140, the disclosed assembly 100 employs the locked nut 130 to impede movement of the construct 120, through the holder members 122, 123, along the stud 110 or the longitudinal axis of the stud 110. Still, the nut 130, interposing between the holder members 122, 123 and secured to the stud 110, permits the construct 120 to rotate about the longitudinal axis of the stud 110. It is important to note that the construct 120 or fastening construct 120 employed in the present disclosure is preferably an integral piece to yield optimal structural strength and able to sustain as much load as possible without breaking into pieces.

FIGS. 1-2 and 4-5 shows one embodiment of the stud 110 usable in the present disclosure. Like aforesaid, the stud 110 has the external elongate surface fabricated with standard screw thread 113 for mounting and securement of the nut 130. Preferably, the stud 110 is made of iron, tungsten, titanium or any alloy derived thereof which are mechanical sturdy and strong materials capable of withholding or supporting the force applied to it as a result of the load or a loaded base member lifted using the disclosed assembly 100. Preferably, steel or stainless steel is employed. For example stainless steel of the grade SS316 or SS304 can be used. The stud 110 can have a diameter ranged from 10 to 25 mm and length of 10 to 20 cm. The elongate stud 110 possesses two opposing ends that one of the ends, referred generally as first end 111 herein, on which the construct 120 will be coupled and mounted to. Preferably, the construct 120 has the holder members 122, 123 slid into the stud 110 and mounted approximate to the first end 111 of the stud 110. Another end, a second end 112 opposing the first end 111, of the stud 110 is preferably secured to a loaded base member to create the needed anchorage for subsequent attachment of the construct 120. More preferably, the construct 120 mounted to the stud 110 is spaced away from the loaded base member at a predetermined distance of 0.5 to 5 cm along the longitudinal axis of the stud 110. The disclosed assembly 100 devotes this portion of the stud 110, a spanning portion between the base member and the holder members 122, 123 or nut 130, to sustain or support the external load or force imposed to the stud 110. In connection to self-alignment of the eyelet 121 corresponding to the direction of the force, the disclosed anchoring assembly 100 always constantly transfers the load applied on the eyelet 121 to the spanning portion. The stud 110, more precisely the spanning portion, becomes a critical part in the disclosed assembly 100 to withstand the load imposed. A removable spacer (not shown) of a prefixed length can be used to wrap around the stud 110 for installing the stud 110 to the base member. The wrapped spacer offers a general measurement or estimation for the user to gauge about the length of the stud 110 exposed above the base member or the length of stud 110 being anchored into the load member. The spacer also functions as a temporary retainer to hold the stud 110 still in some situations and can be dissociated from the stud 110 after the base member has become fully engaged with the second end 112 of the stud 110. For example, the stud 110 can remain stationary using the spacer when it is casted to newly produced concrete platform and have to wait the platform becoming solidified. The spacer is preferably made of inexpensive rubber, composite or plastic materials. For more embodiments, the second end 112 of the stud 110 is chamfered 118 towards the tip. The chamfered 118 second end 112 not only ease casting, trusting, or installing of the stud 110 into the base member, but also visually suggests to the user the correct end to be anchored towards the base member.

In accordance with the preferred embodiments, at least one through tunnel is fabricated on the stud 110 for receiving the pivot pin 140 therein. Preferably, the through tunnel extends on the stud 110 in a fashion intersecting and perpendicular to the longitudinal axis of the stud 110. Multiple separate through tunnels can be created on the stud 110 with through holes 131 correspondingly sized and dimensioned on the nut 130. The multiple tunnels may intersect each other along the longitudinal axis of the stud 110 to yield extra reinforcement needed for the disclosed assembly 100 to take up heavier load. Preferably, the through tunnel has a diameter of 0.5 to 7 mm and spans in a length equivalent to the diameter of the stud 110.

Figure 2:
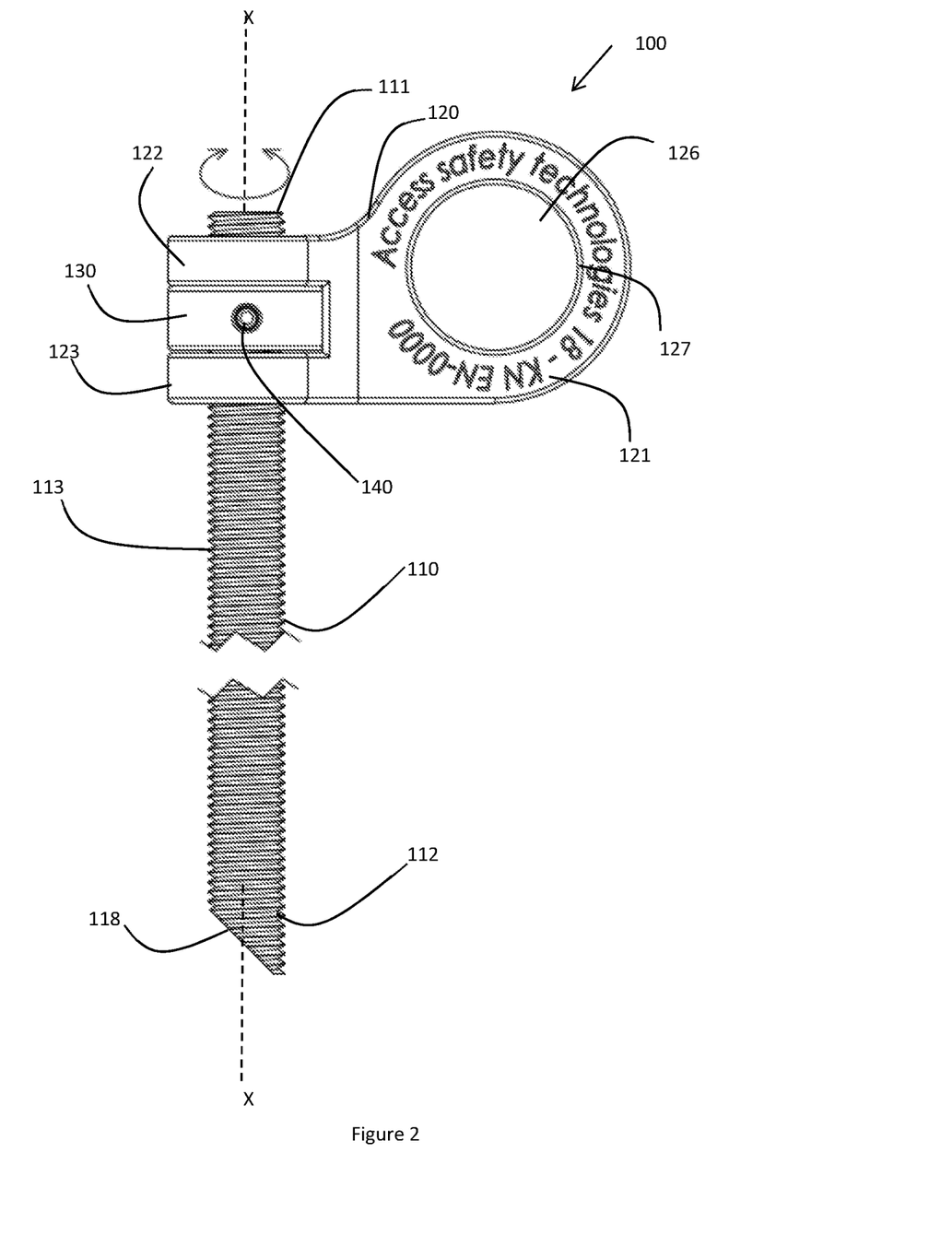
FIG. 2 shows front view of the embodiment illustrated in FIG. 1.
Figure 3:
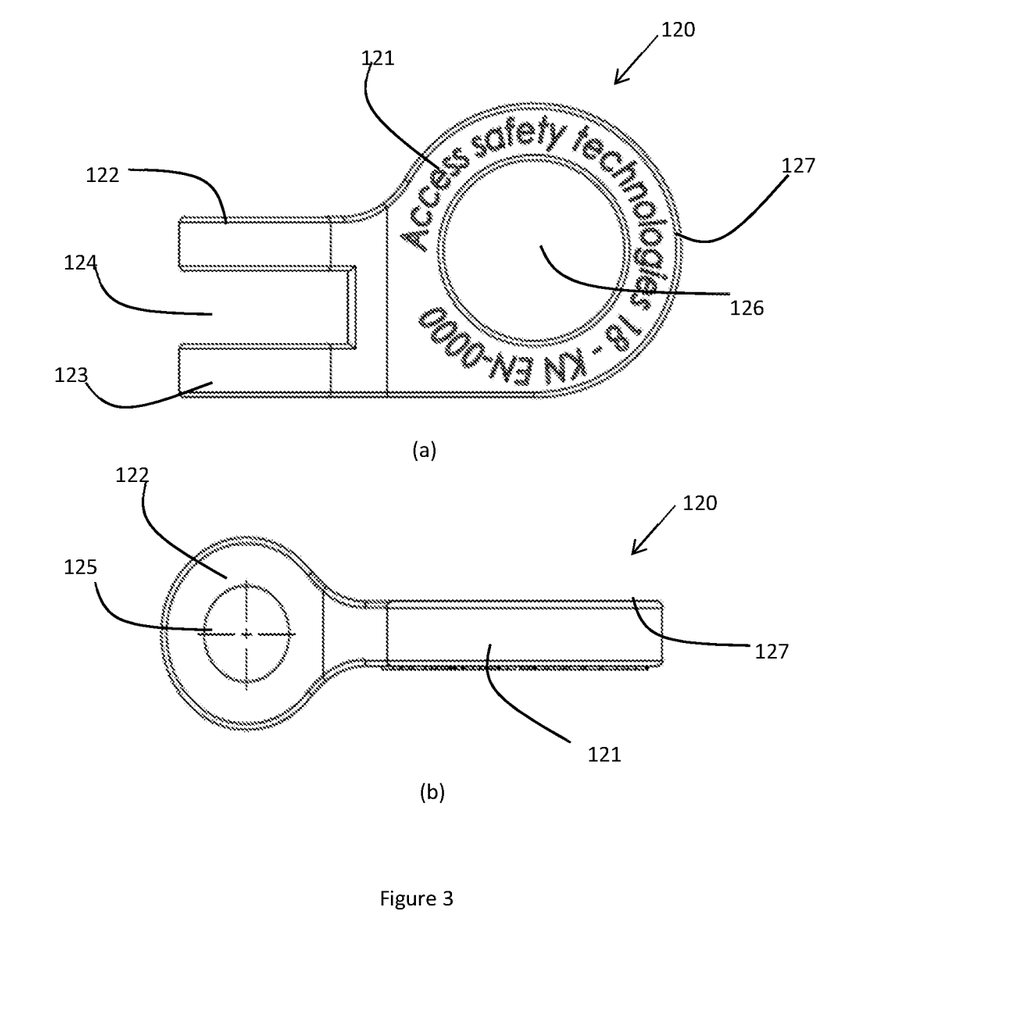

Referring to FIGS. 2 and 3, one embodiment of the fastening construct 120, or simply the construct 120 described hereinafter, is illustrated. As set forth in the foregoing, the construct 120 essentially includes the eyelet 121 and the pair of holder members 122, 123 extending out from the eyelet 121. Preferably, the eyelet 121 is circular in shape enclosing an opening 126 substantially at its center. The enclosed opening 126 allows coupling of ropes, karabiner or the like for attaining various objects or functions set forth above. Preferably, the eyelet 121 has an inner diameter of 20 to 55 mm for the enclosed opening 126 and an outer diameter of 35 to 80 defined by the outer rim of the eyelet 121. The rim of the eyelet 121 is fabricated to be substantially free from hard edges or corners to minimize friction inflicted onto the ropes, steel wires, or karabiner attached to the eyelet 121. More particularly, the edges of the eyelet's rim 127 are chamfered or smoothened, inwardly or outwardly, to reduce wear and tear between the construct 120 and the tool secured to the construct 120. For some embodiments, the holder members 122, 123 may partly involve in defining the opening 126 of the eyelet 121 as shown in the embodiment of FIGS. 4-6.

Pursuant to preferred embodiments depicted in FIGS. 1-3, the eyelet 121 or opening 126 of the eyelet 121 is arranged on a plane corresponding to the longitudinal axis of the stud 110, or the vertical plane. By erecting the eyelet 121 at the vertical plane or the plane corresponds to the longitudinal axis of the stud 110, the disclosed assembly 100 makes hooking of karabiner or attachment of ropes easier. For some embodiments, the eyelet 121 outreaches or extends beyond the first end 111 of the stud 110 to at least partly result the construct 120 to revolve naturally about the longitudinal axis of the stud 110 when a force is applied to the eyelet 121 pulling the disclosed assembly 100 upward. The longitudinal axis of the stud 110 is the rotational axis of the eyelet 121 in these embodiments. Anyhow, for a number of embodiments, the eyelet 121 is free from intersecting with the longitudinal axis of the stud 110 as illustrated in FIGS. 1 and 2. The disclosed assembly 100 in fact positions the eyelet 121 at the side of the stud 110 while the holder members 122, 123 slidably secure to the first end 111 of the stud 110. More preferably, the inventors of the present disclosure have the eyelet 121 of the construct 120 fabricated in a way, on the vertical plane, that the center axis of the eyelet 121 offsets the rotational axis or the longitudinal axis of the stud 110. The center axis of the eyelet 121 is preferably unaligned with or avoided from intersecting the rotational axis in these embodiments. With the like arrangement, the eyelet 121 of the disclosed assembly 100 revolves to align automatically towards a force applied to it as long the force has a substantially upward-directed vector ranging 0 to 180 degree or simply an uplifting force pulling the eyelet 121. The uplifting force can be a creation of a load attached to and exerting the weight onto the stud 110. It is important to note that similar arrangement prompts the eyelet 121 to automatically revolve around the longitudinal axis of the stud 110 almost constantly forming an angle between the longitudinal axis of the stud 110 and the direction of the uplifting force such that the direction of the force and the longitudinal axis of the stud 110 are non-parallel. In more specific, the applied load or force is arranged exerting to the disclosed assembly 100 in a fashion constantly non-parallel to the rotational axis and an angle is persistently posed between the vectors of the uplifting force and the rotational axis. This unavoidably transfers at least part of the applied load or force to the stud 110 and/or holding members of the construct 120. The anchoring assembly 100 of these embodiments deliberately has the stud 110 and/or holding members to at least partly support or bear the applied load rather than solely relying on the engagement of the pivot pin 140 installed thereby, as commonly found in designs of many eyebolts described in the prior arts. Through the aforesaid arrangement, the bearable load of the disclosed assembly 100 is greatly enhanced and increased.

Figure 5:
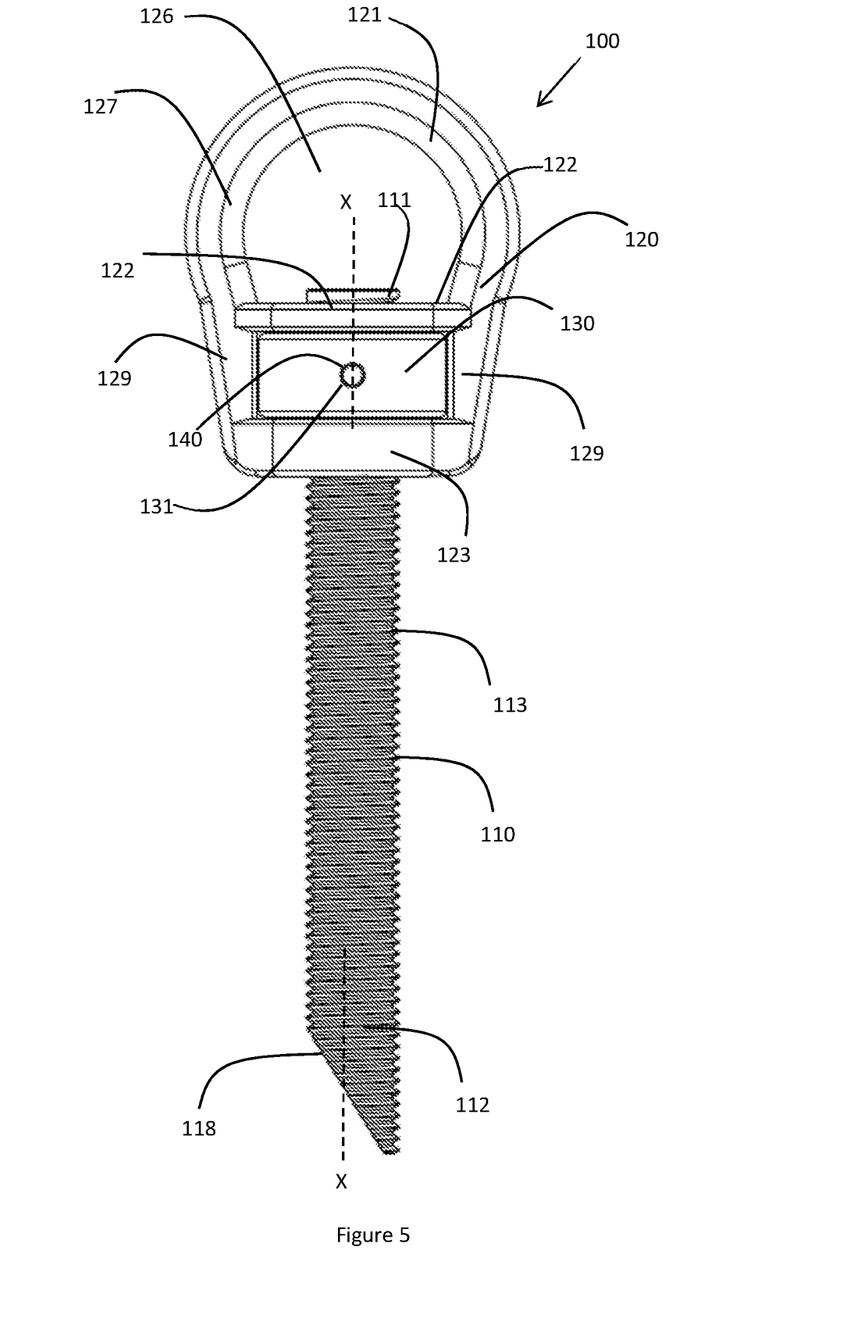
FIG. 5 shows front view of the embodiment illustrated in FIG. 4.
Figure 6:
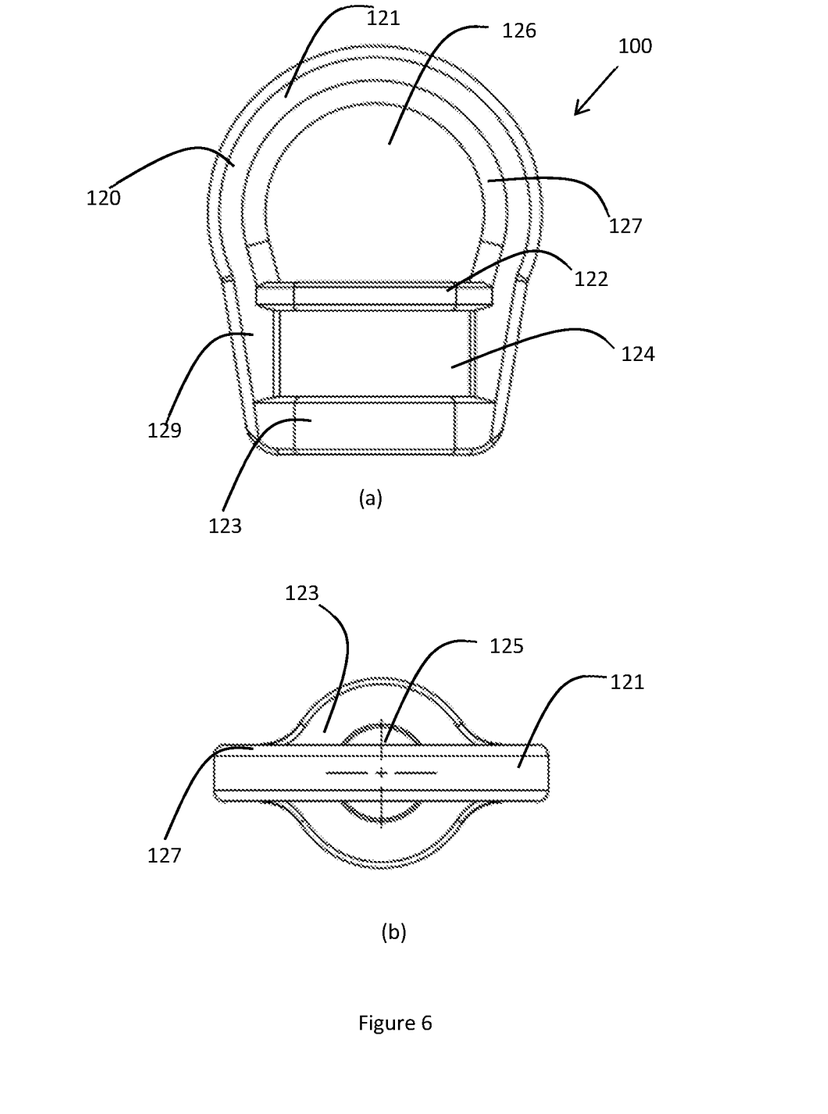

For other embodiments, the center axis of the eyelet 121 has in fact being placed to intersect with the longitudinal axis of the stud 110 as presented in FIG. 4-6. The eyelet 121 is located right above of the first end 111 of the stud 110. Small segment of the stud's first end 111 may protrude into the opening 126 of the eyelet 121. Preferably, the opening 126 of the eyelet 121 is arranged on the plane corresponding to the longitudinal axis of the stud 110 and the center axis of the eyelet 121 is substantially intersecting with the rotational axis or longitudinal axis of the stud 110. Shown in FIG. 6, the opening 126 of the eyelet 121 is partly defined by the one of the holder member. The outer and inner edges of the eyelet 121 are chamfered to remove any hard corner too. Preferably, the eyelet 121 has an outer diameter approximate to or slightly larger than the outer diameter of the holder members 122, 123 positioned underneath it. The eyelet 121 is rotatable about the longitudinal axis of the stud 110 too.

Referring further to FIGS. 1-3, the holder members 122, 123 are projected out from the side of the eyelet 121. The disclosed assembly 100 carries at least two or a pair of holder members 122, 123 to be fixed to the stud 110. Preferably, the holder members 122, 123 closer to and further away from the tip of the first end 111 are respectively referred as a top holder member 122 and a bottom holder member 123 in the present description. The holder members 122, 123 are pieces perpendicular to the eyelet 121 in general. Or, in more general, the opening 126 of the eyelet 121 is arranged on a plane perpendicular to a plane at which the aperture 125 of the holder members 122, 123 are oriented or expanded across. Particularly, the holder members 122, 123 span across the horizontal plane while the eyelet 121 stretches along the vertical plane. Coupling the holder member to the stud 110 erects the eyelet 121 at the vertical plane or the plane corresponding to the rotational axis. As in the setting forth, each holder member defines an aperture 125 at its center axis. The apertures 125 preferably are in a diameter slightly larger than the stud 110 favoring friction-free rotational movement about the rotational axis by mounting onto the stud 110. Particularly, the defined aperture 125 is of a diameter 0.1 to 2 mm greater than the diameter of the stud 110. In the referred FIGS. 2 and 3a, the paired holder members 122, 123 are equally dimensioned and sized but such uniformity is not necessary in other embodiments. One of the holder members 122, 123 can be thicker and/or larger in size than another according to different designs of the disclosed assembly 100. More importantly, the disclosed assembly 100 has the holder members 122, 123 axially aligned, with a cavity 124 of a predetermined length spacing each other. The stud 110 can effortlessly slide into the axially aligned apertures 125 of the holder members 122, 123 for securing the whole construct 120 thereto with further aid from the nut 130 and the pivot pin 140. The present disclosure directs the cavity 124 present between the holder members 122, 123 for accommodating nut 130 and the pivot, which collectively function as a stopper to impede the construct 120 to transverse along the stud 110 once the disclosed anchoring assembly 100 is properly put together. Preferably, the cavity 124 is prepared to be slightly wider than the thickness of the nut 130 installed therein. The extra clearance warrants less hindrance on the rotational displacement of the construct 120 around the stud 110.

Several embodiments of disclosed assembly 100 also preferably pair the holder members 122, 123 in a fashion causing the established eyelet 121 to outreach the first end 111 of the stud 110. As illustrated in FIGS. 2 and 3a, the holder members 122, 123 may be axially aligned and extend in parallel from the outer rim of the eyelet 121. The embodiments shown in FIG. 2 have the parallel extending holder members 122, 123 spaced apart at a distance not more than outer radius of the eyelet 121 and positioned at a level not higher than a center point, X, of the eyelet 121 along the vertical plane or the plane corresponding to the stud 110. In more simplified embodiments, the like feature can be attained by having the top holder member 122 fabricated at a level on the vertical plane not higher than or only slightly higher than the center point of the eyelet 121. Asymmetrical configuration of the holder members 122, 123 in relation to the eyelet 121 in these embodiments at least partly conducive to spontaneous rotational movement of the eyelet 121 to constantly create an angle between the vector of the applied force and the rotational axis.

Attention shall now be drawn to FIGS. 5 and 6a-b, another embodiment of the construct 120 is disclosed. Like described in the foregoing, the anchoring assembly 100, as disclosed in these embodiments, positions the eyelet 121 right atop of the holder member upon mounting of the construct 120 to the stud 110. The top holder member 122 forms portion of the eyelet 121 in defining the opening 126 of the eyelet 121. Despite the relative positions of the eyelet 121 and the holder members 122, 123 are different from the embodiments mentioned above, the holder members 122, 123 and the eyelet 121 are respectively expanding on plane perpendicular to one for default vertical establishment of the eyelet 121. Similar to its aforesaid counterparts, the holder member defines an aperture 125 of a diameter slightly larger than the stud 110 in 0.1 to 2 mm axially aligned underneath of the eyelet 121. A pair of arms 129 preferably extends from the eyelet to join the axially aligned top holder member 122 and bottom holder member 123 together under the eyelet 121. The cavity 124 of predetermined length is carved between the top 122 and bottom holder members 123. Engagement of the holder members 122, 123 with the stud 110 can be realized by passing the stud 110 through the axially aligned apertures 125 and the nut 130 interposing between the holder members 122, 123. The embodiments illustrated in FIG. 4-6 shows that eyelet 121 aligns the center point with the rotational axis. Nevertheless, there are embodiments in which the center point offsets or are unaligned with the rotational axis giving rise to the vector angle between the applied load or force and the rotational axis. For example, the disclosed assembly 100 may place the eyelet 121 asymmetrically on top of the holder member 122, 123 thus shifting the center point away from the rotational axis.

Again, referring to FIGS. 4-6, the holder member closer to the eyelet 121, or the top holder member 122, has a thickness relatively lower than the holder member located further away from the eyelet 121, or the bottom holder member 123. Owing to the relative position of the eyelet 121 and the position of the holder members 122, 123 in the construct 120 of such embodiments, the described anchoring assembly 100 may expose the bottom holder member to higher load compared to the top holder member 122 when the load or the force, generated due to action and reaction of the load, becomes aligned with the rotational axis or the longitudinal axis of the stud 110. Any load attached under the disclosed assembly 100 pulls the stud 110 and nut 130 towards the bottom holder member 123 and being supported thereof. Therefore, for few embodiments, the bottom holder member 123 is mechanically reinforced by increasing its thickness.

As in the foregoing, a clearance is preferably created around the engagement of the nut 130 and the holder member for smooth rotational movement of the construct 120. Preferably, the thickness of the nut 130 is shorter than the length of the cavity 124. More particularly, the nut 130 has a thickness of 0.05 to 1 mm shorter than the predetermined length of the cavity 124 spacing the holder members 122, 123 apart. The nut 130 has an outer diameter also preferably shorter in comparison to the width of the cavity 124 across the horizontal plane, providing extra clearance or space in favor of smooth rotational movement of the eyelet 121. The inner diameter of the nut 130 substantially corresponds to the diameter of the stud 110 enclosing a bore, preferably with threaded track, for receiving the stud 110. Like abovementioned, the nut 130 carries the pair of axially aligned and radially extending through holes 131 on the sidewall for forming the passage in conjunction with the through tunnel. The formed passage is directed to harbor the pivot pin 140 for fastening or locking the nut 130 to the stud 110. The pivot pin 140 can be a spring pin, either coiled spring pin or slotted spring pin, fabricated with a length longer than the diameter of the stud 110 but shorter than the formed passage. The opposing extremes of the pivot pin 140 are preferably resided within the pair of axially aligned through holes 131 on the nut 130, while the body of the pivot pin 140 fills the through tunnel. More preferably, the body of the pivot pin 140 has a diameter somewhat or moderately larger than the formed passage. On the other hand, the opposing extremes of the pivot pin 140 are of a diameter faintly smaller or approximate to the diameter of the formed passage. The body of the pivot pin 140 appears slightly deformed upon insertion into the passage. The slight deformation prohibits accidental dissociation or disengagement of the pivot pin 140 from the passage. By the aid of the pivot pin 140, the disclosed assembly 100 employs the locked nut 130 to impede movement of the construct 120, through the holder members 122, 123, along the stud 110 or the longitudinal axis of the stud 110.

Figure 7:
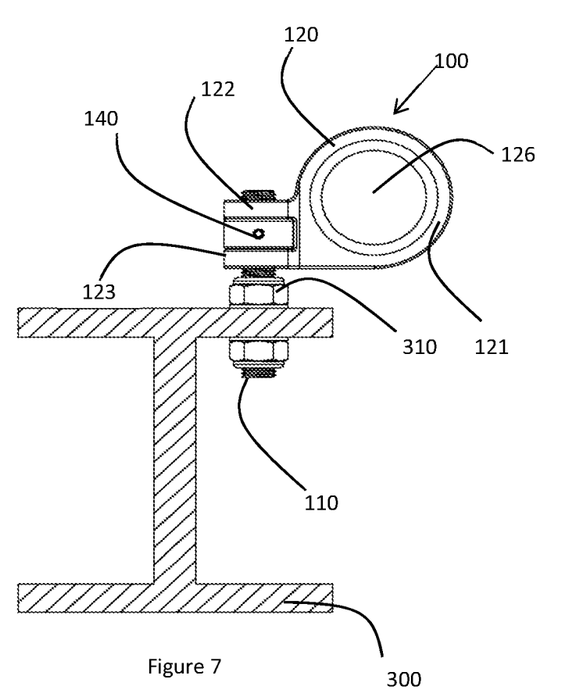
FIG. 7 illustrates implementation of the disclosed assembly in load lifting.
Figure 8:
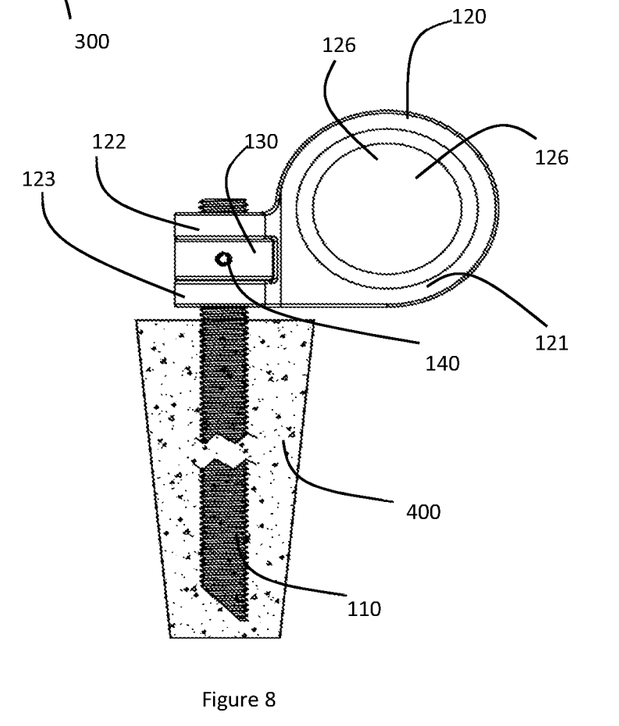
FIG. 8 illustrates another implementation of the disclosed assembly by way of fixing to a concrete platform to serve as an anchorage point for height access or fall arrest.

FIGS. 7 and 8 exemplify implementation of the disclosed anchoring assembly 100. For load lifting, the second end 112 of the stud 110 of the disclosed assembly 100 can be driven into the load 300, which is tightly clamped between a pair of nuts 310, preferably with washers, mounted to the stud 110 as illustrated in FIG. 7. External force applies to the eyelet 121 for lifting the load 300 shall actuate rotation of the eyelet 121 about the rotational axis naturally forming a vector angle between the applied force and the rotational axis. FIG. 8 shows another application of the disclosed anchoring assembly 100 for fall-protection or fall-arrest. Particularly, the second end 112 of the stud 110 is cast into a concrete platform 400 leaving the eyelet 121 on top of the platform for attachment of rope or karabiner. Likewise, the eyelet 121 rotates according to the motion or movement of the force exerted through the attached rope or karabiner.

Although this invention has been described in its preferred form with a degree of particularity, it is understood that the present disclosure of the preferred form has been made only by way of example and that numerous changes in the details of construction and the combination and arrangements of parts may be resorted to without departing from the scope of the invention.

The invention claimed is:

1. An anchoring assembly comprising
    a stud with an external elongate surface carrying a screw thread, and a through tunnel fabricated on the stud intersecting and perpendicular to a longitudinal axis of the stud;
    a construct comprising an eyelet enclosing an opening and a pair of holder members extending out from the eyelet, each of the holder members defining an aperture at a center axis and the defined apertures being of a diameter 0.1 to 2 mm greater than a diameter of the stud, the holder members being axially aligned with a cavity of a predetermined length spacing each other, the holder members receiving the stud through the apertures;
    a nut having a sidewall defining an internally threaded passage, the nut being securable onto the stud through the screw thread and resides within the cavity to interpose between the pair of holder members, the nut carrying a pair of axially aligned and radially extending through holes on the sidewall, the through holes being adjustable relative to the stud to align with the through tunnel forming a continuous passage thereof; and
    a pivot pin fillable into the passage across the through holes and the through tunnel to lock the nut to the stud, wherein the eyelet is rotatable around the longitudinal axis of the stud and the locked nut impedes the construct to move along longitudinal axis of the stud.

2. The anchoring assembly of claim 1, wherein the opening of the eyelet is arranged on a plane corresponding to the longitudinal axis of the stud and the eyelet is free from intersecting with the longitudinal axis of the stud.

3. The anchoring assembly of claim 1, wherein the opening of the eyelet is arranged on a plane corresponding to the longitudinal axis of the stud and the a center axis of the eyelet is substantially intersecting with the longitudinal axis of the stud.

4. The anchoring assembly of claim 3, wherein a one of said holder members closer to the eyelet has a thickness relatively lower than a other one of said holder members further from the eyelet.

5. The anchoring assembly of claim 1, wherein the nut has a thickness of 0.05 to 1 mm shorter than the predetermined length of the cavity spacing the holder members apart.

6. The anchoring assembly of claim 1, wherein the construct is an integral piece.

7. The anchoring assembly of claim 1, wherein the opening of the eyelet is arranged on a plane perpendicular to a plane at which the aperture of the holder members are oriented.

8. The anchoring assembly of claim 1, wherein the eyelet has the edge adjacent to the opening chamfered.

9. The anchoring assembly of claim 1, wherein the pivot pin is a spring pin.

10. The anchoring assembly of claim 1, wherein the stud has two ends that the construct is mounted approximate to one end and another end of the stud is secured to a loaded base member.

11. The anchoring assembly of claim 10, wherein the construct is spaced away from the loaded base member at a predetermined distance of 3 to 8 cm along the longitudinal axis of the stud.

12. The anchoring assembly of claim 1, wherein the eyelet has a center axis and the center axis is configured to offset the longitudinal axis of the stud such that the eyelet automatically aligns towards a force upon pulling of the force.

13. The anchoring assembly of claim 12, wherein the eyelet is fashioned to automatically revolve around the longitudinal axis of the stud constantly forming an angle between the longitudinal axis of the stud and the direction of the force such that the direction of the force and the longitudinal axis of the stud are non-parallel.

* * * * *